(12) United States Patent
Kumagai et al.

(10) Patent No.: US 12,296,586 B2
(45) Date of Patent: May 13, 2025

(54) PRINTING DEVICE

(71) Applicant: SEIKO EPSON CORPORATION, Tokyo (JP)

(72) Inventors: Masaru Kumagai, Shiojiri (JP); Yuki Ishii, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 166 days.

(21) Appl. No.: 18/165,823

(22) Filed: Feb. 7, 2023

(65) Prior Publication Data

US 2023/0249454 A1   Aug. 10, 2023

(30) Foreign Application Priority Data

Feb. 8, 2022 (JP) .................. 2022-017605

(51) Int. Cl.
*B41J 2/045* (2006.01)
*B41J 3/407* (2006.01)
*B25J 9/12* (2006.01)

(52) U.S. Cl.
CPC ....... *B41J 2/04573* (2013.01); *B41J 2/04581* (2013.01); *B25J 9/126* (2013.01); *B41J 3/4073* (2013.01)

(58) Field of Classification Search
CPC ...................................................... B41J 3/407
See application file for complete search history.

(56) References Cited

U.S. PATENT DOCUMENTS

| | | | |
|---|---|---|---|
| 2009/0167817 A1* | 7/2009 | Orr | ........... B29C 64/106 |
| | | | 347/37 |
| 2020/0269601 A1* | 8/2020 | Lewis | ........... B41J 3/543 |

FOREIGN PATENT DOCUMENTS

JP        2016-215438 A    12/2016

* cited by examiner

*Primary Examiner* — Scott A Richmond
(74) *Attorney, Agent, or Firm* — WORKMAN NYDEGGER

(57) ABSTRACT

A printing device includes a head that ejects liquid to a work; a robot that changes relative positions of the work and the head; a positional information output unit that outputs positional information regarding a position of the robot; and a timing adjuster that adjusts, based on the positional information, an ejection timing of ejecting the liquid from the head. When a timing of acquiring first positional information as the positional information by the timing adjuster is a first acquisition timing, a timing of acquiring second positional information as the positional information by the timing adjuster after the first acquisition timing is a second acquisition timing, and the ejection timing after the second acquisition timing is a first ejection timing, the timing adjuster adjusts the first ejection timing based on the first positional information and the second positional information.

14 Claims, 10 Drawing Sheets

PRINTING DEVICE

The present application is based on, and claims priority from JP Application Serial Number 2022-017605, filed Feb. 8, 2022, the disclosure of which is hereby incorporated by reference herein in its entirety.

BACKGROUND

1. Technical Field

The present disclosure relates to a printing device.

2. Related Art

An ink jet printing device that uses a robot such as an articulated robot is known. For example, a device described in JP-A-2016-215438 includes a head that is an ink jet head, a robot holding the head, a head controller that controls driving of the head, and a robot controller that controls driving of the robot. The robot controller calculates a moving speed of the head by synthesizing speeds of multiple members of the robot that rotate around multiple axes and outputs a speed signal including information of the calculated moving speed to the head controller. The head controller controls the driving of the head based on the information from the robot controller.

In the device described in JP-A-2016-215438, the head controller may not be able to cause the head to operate at a desired timing due to a constraint on the control cycle of the robot controller.

SUMMARY

In order to solve the above-described problem, according to an aspect of the present disclosure, a printing device includes a head that ejects liquid to a work; a robot that changes relative positions of the work and the head; a positional information output unit that outputs positional information regarding a position of the robot; and a timing adjuster that adjusts, based on the positional information, an ejection timing of ejecting the liquid from the head. When a timing of acquiring first positional information as the positional information by the timing adjuster is a first acquisition timing, a timing of acquiring second positional information as the positional information by the timing adjuster after the first acquisition timing is a second acquisition timing, and the ejection timing after the second acquisition timing is a first ejection timing, the timing adjuster adjusts the first ejection timing based on the first positional information and the second positional information.

DESCRIPTION OF EXEMPLARY EMBODIMENTS

Figure 1:
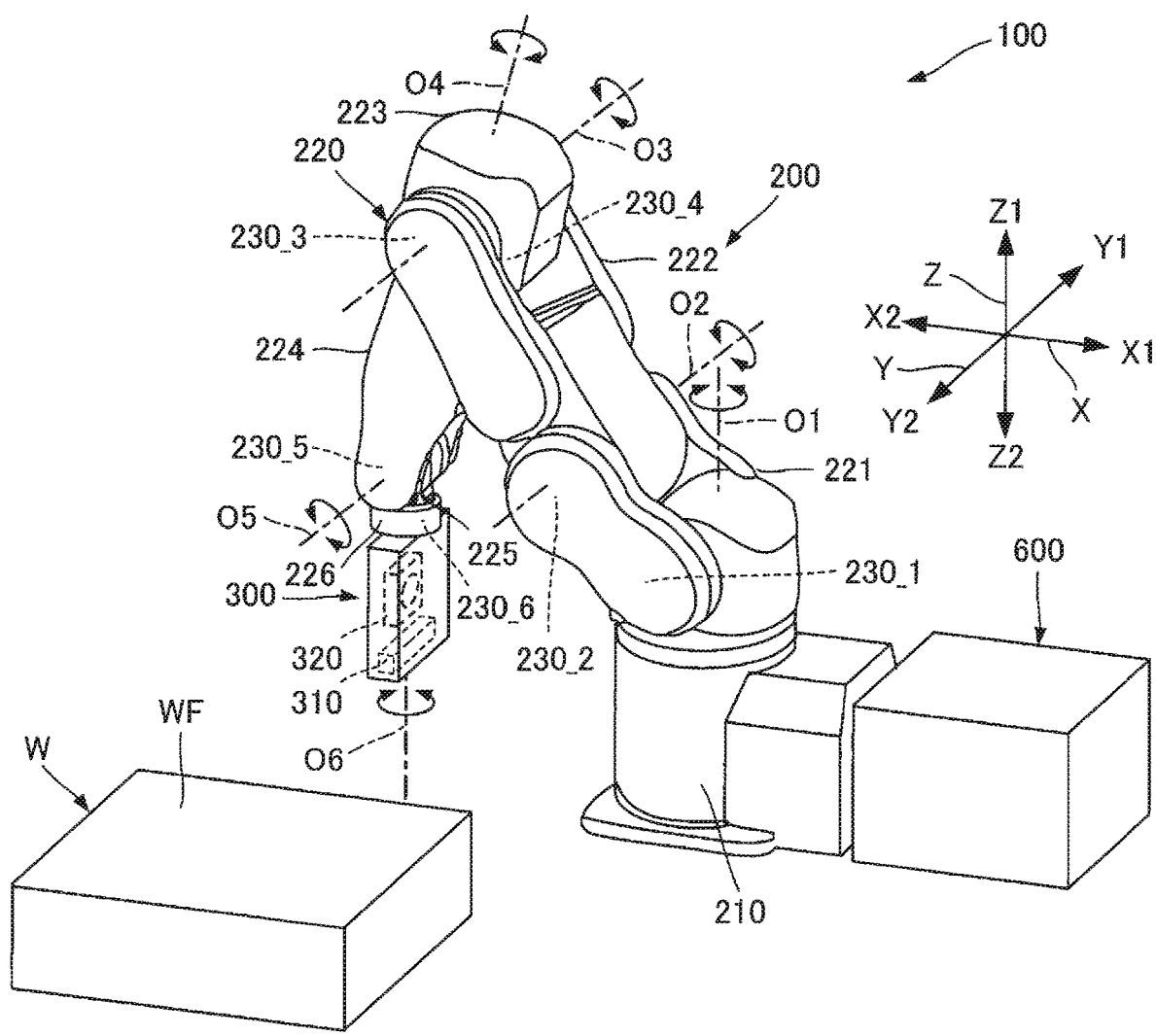
FIG. 1 is a perspective view schematically illustrating a printing device according to a first embodiment.

Hereinafter, embodiments of the present disclosure are described with reference to the accompanying drawings. In the drawings, dimensions and scale of each part may be different from the actual dimensions and scale as appropriate, and some parts are schematically illustrated in order to facilitate understanding. In addition, the scope of the present disclosure is not limited to the embodiments unless there is a description to the effect that the present disclosure is particularly limited in the following description.

In the following description, X, Y, and Z axes intersecting each other are used as appropriate. In addition, in the following description, one of directions along the X axis is an X1 direction, the other direction opposite to the X1 direction is an X2 direction. Similarly, directions opposite to each other along the Y axis are a Y1 direction and a Y2 direction. In addition, directions opposite to each other along the Z axis are a Z1 direction and a Z2 direction.

The X, Y, and Z axes correspond to coordinate axes of a world coordinate system set in a space in which a robot 200 described later is installed. Typically, the Z axis corresponds to a vertical axis and the Z2 direction corresponds to a downward direction in the vertical direction. A base coordinate system based on the position of a base 210 of the robot 200 is associated with the world coordinate system by calibration. The base 210 is described later. A case where the operation of the robot 200 is controlled using the world coordinate system as a robot coordinate system is exemplified later.

The Z axis may not be the vertical axis. In addition, the X, Y, and Z axes are typically perpendicular to each other but are not limited thereto. The X, Y, and Z axes may not be perpendicular to each other. For example, The X, Y, and Z axes may intersect each other at an angle of 80° or greater and 100° or less.

1. First Embodiment 1-1. Overview of Printing Device

FIG. 1 is a perspective view schematically illustrating a printing device 100 according to a first embodiment. The printing device 100 performs printing on a surface of a work W by an ink jet method.

The work W has a surface WF to be printed. In the example illustrated in FIG. 1, the work W is a cuboid and the surface WF is a flat surface facing toward the Z1 direction. A target to be printed may be a surface other than the surface WF among a plurality of surfaces of the work W. In addition, the size of the work W, the shape of the work W, or the orientation of the work W are not limited to the example illustrated in FIG. 1 and are arbitrary.

In the example illustrated in FIG. 1, the printing device 100 is an ink jet printer that uses the vertical articulated robot. Specifically, as illustrated in FIG. 1, the printing device 100 includes the robot 200, a head unit 300, and a controller 600. The controller 600 is an example of a "robot controller". First, the units of the printing device 100 illustrated in FIG. 1 are briefly described below.

The robot 200 is a moving mechanism that changes the relative position and orientation of the head unit 300 with respect to the work W. In the example illustrated in FIG. 1, the robot 200 is a so-called 6-axis vertical articulated robot. Specifically, the robot 200 includes the base 210 and an arm 220.

The base 210 supports the arm 220. In the example illustrated in FIG. 1, the base 210 is fixed to an installation surface, such as a floor surface facing toward the Z1 direction, via a screw or the like. The installation surface to which the base 210 is fixed may face toward any direction and is not limited to the example illustrated in FIG. 1. For example, the installation surface may be a wall, a ceiling, or a surface of a movable trolley or the like.

The arm 220 is a 6-axis robot arm including a proximal end attached to the base 210, and a distal end whose position and orientation are three-dimensionally changed with respect to the proximal end. Specifically, the arm 220 includes arms 221, 222, 223, 224, 225, and 226 coupled to each other in this order.

The arm 221 is coupled to the base 210 via a joint 230_1 such that the arm 221 is rotatable around a first rotation axis O1. The arm 222 is coupled to the arm 221 via a joint 230_2 such that the arm 222 is rotatable around a second rotation axis O2. The arm 223 is coupled to the arm 222 via a joint 230_3 such that the arm 223 is rotatable around a third rotation axis O3. The arm 224 is coupled to the arm 223 via a joint 230_4 such that the arm 224 is rotatable around a fourth rotation axis O4. The arm 225 is coupled to the arm 224 via a joint 230_5 such that the arm 225 is rotatable around a fifth rotation axis O5. The arm 226 is coupled to the arm 225 via a joint 230_6 such that the arm 226 is rotatable around a sixth rotation axis O6. Each of the joints 230_1 to 230_6 may be hereinafter referred to as a joint 230.

Each of the joints 230_1 to 230_6 is an example of a "movable portion". FIG. 1 exemplifies a case where the number N of joints 230 is 6. In the example illustrated in FIG. 1, each of the joints 230_2 to 230_6 is a mechanism coupling one of two adjacent arms among the arms 221 to 226 to the other arm such that the one of the two adjacent arms is movable with respect to the other arm, and the joint 230_1 is a mechanism coupling the base 210 to the arm 221 such that the arm 221 is movable with respect to the base 221. Although not illustrated in FIG. 1, for each of the joints 230_1 to 230_6, a drive mechanism that rotates one of two adjacent arms among the arms 221 to 226 with respect to the other arm is provided. Each of the drive mechanisms includes, for example, a motor that generates driving force for the rotation, a reducer that reduces the driving force and outputs the reduced driving force, and an encoder such as a rotary encoder that detects an operational amount such as the rotation angle or the like, for example. A set of the drive mechanisms corresponds to an arm drive mechanism 240 illustrated in FIG. 2 described later. The encoders correspond to encoders 241 illustrated in FIG. 2 and the like described later.

The first rotation axis O1 is orthogonal to the installation surface to which the base 210 is fixed. The installation surface is not illustrated. The second rotation axis O2 is orthogonal to the first rotation axis O1. The third rotation axis O3 is parallel to the second rotation axis O2. The fourth rotation axis O4 is orthogonal to the third rotation axis O3. The fifth rotation axis O5 is orthogonal to the fourth rotation axis O4. The sixth rotation axis O6 is orthogonal to the fifth rotation axis O5.

Regarding these rotation axes, "orthogonal" means that an angle formed by two rotation axes orthogonal to each other among the rotation axes O1 to O6 is exactly 90° and that the angle formed by the two rotation axes may be in a range of 90°±5°. Similarly, "parallel" means that two rotation axes among the rotation axes O1 to O6 are exactly parallel to each other and that one of the two rotation axes may be inclined with respect to the other rotation axis at an angle in a range of ±5°.

The head unit 300 is attached as an end effector to the distal end of the arm 220, that is, to the arm 226.

The head unit 300 is a mechanism including a head 310 that ejects ink toward the work W. The ink is an example of liquid. In the present embodiment, the head unit 300 includes a pressure control valve 320 in addition to the head 310. The pressure control valve 320 controls pressure of the ink to be supplied to the head 310. Since the pressure control valve 320 and the head 310 are fixed to the arm 226, relationships between relative positions and orientations of the pressure control valve 320 and the head 310 with respect to each other are fixed. The head unit 300 may include a sensor that detects a relative position of the head 310 with respect to the work W, a light source for curing or solidifying the ink, and the like, in addition to the head 310 and the pressure control valve 320, for example.

Although not illustrated in FIG. 1, the head 310 includes a plurality of piezoelectric elements, a plurality of cavities for storing the ink, and a plurality of nozzles. Each of the nozzles is provided for a respective one of the cavities and communicates with the cavity. Each of the piezoelectric elements is provided for a respective one of the cavities and change pressure in the cavity to eject the ink from the nozzle corresponding to the cavity. The head 310 configured in this manner is obtained by bonding a plurality of substrates, such as silicon substrates appropriately processed by etching, with an adhesive or the like. The piezoelectric elements correspond to piezoelectric elements 311 illustrated in FIG. 2 described later. Instead of the piezoelectric elements, a heater that heats the ink in the cavities may be used as a drive element for ejecting the ink from the nozzles.

The pressure control valve 320 is a valve mechanism that is opened and closed according to the pressure of the ink within the head 310. By opening and closing the pressure control valve 320, the pressure of the ink within the head 310 is maintained at a negative pressure level within a predetermine range. This stabilizes the meniscus of the ink formed in the nozzles N of the head 310. As a result, air bubbles are prevented from entering the nozzles N, and the ink is prevented from overflowing from the nozzles N.

In the example illustrated in FIG. 1, although the head unit 300 includes the single head 310 and the single pressure control valve 320, the number of heads 310 included in the head unit 300 and the number of pressure control valves 320 are not limited to the example illustrated in FIG. 1 and may be 2 or greater. In addition, the pressure control valve 320 may not be attached to the arm 226 and may be attached to any of the other arms or the like or may be arranged in a fixed position with respect to the base 210, for example.

The head 310 is coupled to a liquid supply unit via the pressure control valve 320. The liquid supply unit is not illustrated. The liquid supply unit includes a liquid reservoir and a supply flow path. The liquid reservoir is a container that stores the ink. The ink stored in the liquid reservoir is, for example, ink containing a color material or ink containing a conductive material such as metal powder. The ink may be curable. For example, the ink may be ultraviolet curable ink. The supply flow path is constituted by a tubular body through which the ink is supplied from the liquid reservoir to the pressure control valve 320. The tubular body is made of an elastic material such as a rubber material or an elastomer material and is flexible, for example.

The controller 600 is a robot controller that controls driving of the robot 200. Although not illustrated in FIG. 1, a control module that controls an ejection operation in the head unit 300 is electrically coupled to the controller 600. The controller 600 and the control module are communicably connected to a computer. The control module is an example of a "head driving unit" and corresponds to a control module 500 illustrated in FIG. 2 described later. The computer corresponds to a computer 700 illustrated in FIG. 2 described later.

1-2. Electrical Configuration of Printing Device

Figure 2:
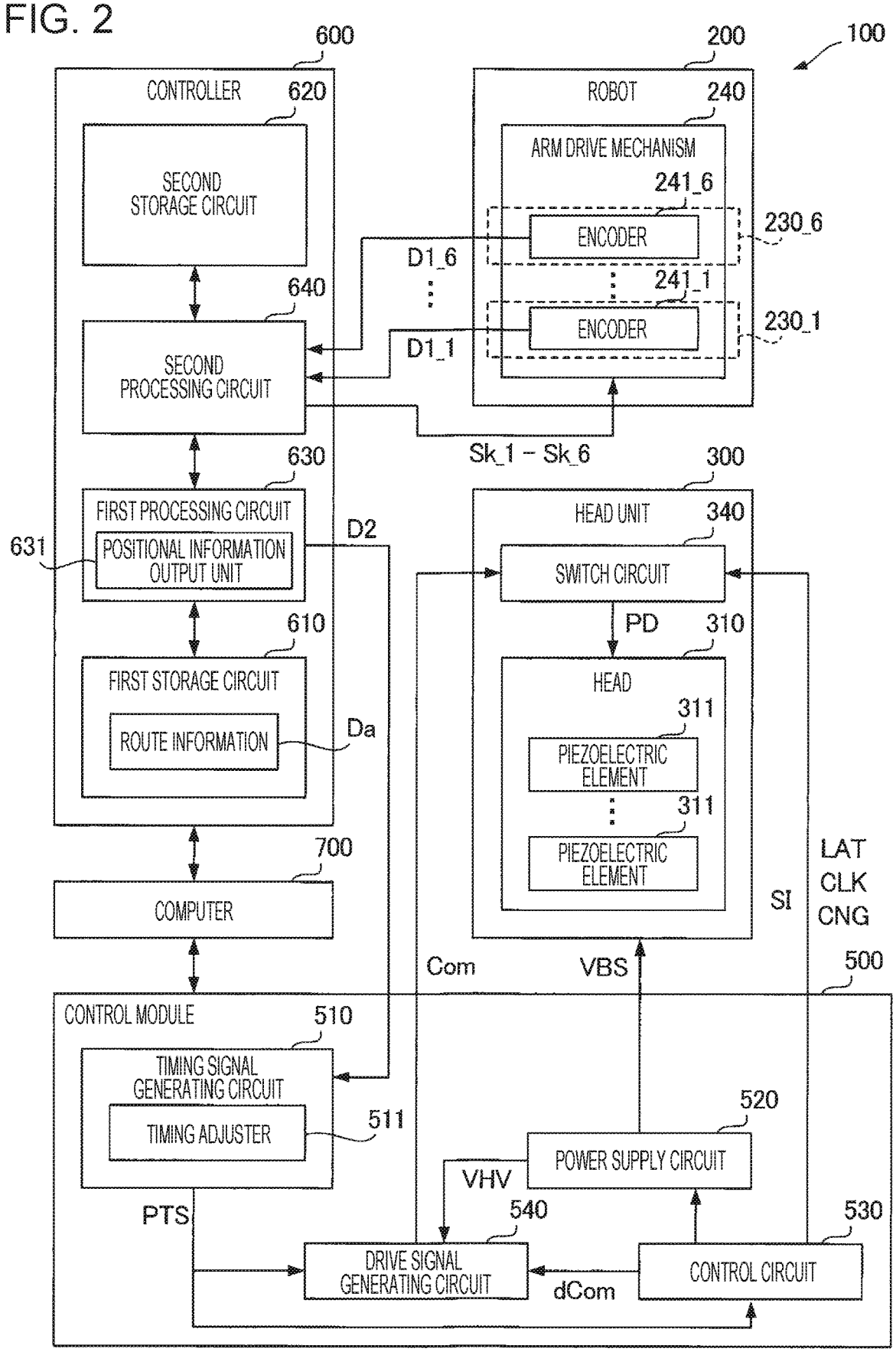
FIG. 2 is a block diagram illustrating an electrical configuration of the printing device according to the first embodiment.

FIG. 2 is a block diagram illustrating an electrical configuration of the printing device 100 according to the first embodiment. FIG. 2 illustrates electrical constituent components among constituent components of the printing device 100. In addition, FIG. 2 illustrates the arm drive mechanism 240 including the encoders 241_1 to 241_6. The arm drive mechanism 240 is a set of the above-described drive mechanisms that cause the joints 230_1 to 230_6 to operate. The encoders 241_1 to 241_6 are rotary encoders provided corresponding to the joints 230_1 to 230_6 and measure operational amounts such as rotation angles of the joints 230_1 to 230_6. Each of the encoders 241_1 to 241_6 may be hereinafter referred to as an encoder 241.

As illustrated in FIG. 2, the printing device 100 includes the robot 200, the head unit 300, the controller 600, the control module 500, and the computer 700, which are described above. The control module 500 is an example of the "head driving unit". Electric constituent components described below may be appropriately divided or some of the electric constituent components may be included in one or more of the other constituent components or may be integrated with one or more of the other constituent components. For example, a part or all of functions of the control module 500 or a part or all of functions of the controller 600 may be implemented by the computer 700 connected to the controller 600 or may be implemented by another external device such as a personal computer (PC) connected to the controller 600 via a network such as a local area network (LAN) or the Internet. A part or all of the functions of the control module 500 can be implemented by the controller 600.

The controller 600 includes a function of controlling the driving of the robot 200 and a function of generating positional information D2 regarding the position of the head 310. The controller 600 includes a first storage circuit 610, a second storage circuit 620, a first processing circuit 630, and a second processing circuit 640.

The first storage circuit 610 stores various programs to be executed by the first processing circuit 630 and various data to be processed by the first processing circuit 630. The first storage circuit 610 includes, for example, a semiconductor memory including either one or both of a volatile memory such as a random-access memory (RAM) and a nonvolatile memory such as a read-only memory (ROM), an electrically erasable programmable read-only memory (EEPROM), or a programmable ROM (PROM). A part of the first storage circuit 610 or the entire first storage circuit 610 may be included in the first processing circuit 630.

Route information Da is stored in the first storage circuit 610. The route information Da is information indicating a route along which the head 310 is to be moved. For example, the route information Da is represented using coordinate values in the base coordinate system. The route information Da is determined based on work information indicating the position and shape of the work W. The work information is obtained by associating information of computer-aided design (CAD) data indicating a three-dimensional shape of the work W or the like with the base coordinate system described above. The route information Da is input to the first storage circuit 610 from the computer 700.

The second storage circuit 620 stores various programs to be executed by the second processing circuit 640 and various data to be processed by the second processing circuit 640. The second storage circuit 620 includes, for example, a semiconductor memory including either one or both of a volatile memory such as a random-access memory (RAM) and a nonvolatile memory such as a read-only memory (ROM), an electrically erasable programmable read-only memory (EEPROM), or a programmable ROM (PROM). A part of the second storage circuit 620 or the entire second storage circuit 620 may be included in the second processing circuit 640 or may be integrated with the first storage circuit 610.

Correspondence information Db is stored in the second storage circuit 620. The correspondence information Db is information regarding a correspondence relationship between output from one of the encoders 241_1 to 241_6 and time or a position. The correspondence information Db is input to the second storage circuit 620 from the computer 700. The correspondence information Db is described later in detail.

The first processing circuit 630 calculates an operational amount of each of the joints 230_1 to 230_6 based on the route information Da. Specifically, the first processing circuit 630 performs inverse kinematics calculation to convert the route information Da into operational amounts such as rotation angles of the joints 230_1 to 230_6 and rotation speeds of the joints 230_1 to 230_6.

In the present embodiment, the first processing circuit 630 calculates coordinates indicating the position of the head 310 based on signals from the encoders 241_1 to 241_6 to generate the positional information D2 indicating the results of calculating the coordinates. The calculation is, for example, performed by performing forward kinematics calculation to convert the operational amounts such as the rotation angles and rotation speeds of the joints 230_1 to 230_6 indicated by signals D1_1 to D1_6 from the encoders 241_1 to 241_6 into coordinate values of the head 310. The positional information D2 is information regarding the position of the head 310 and coordinates indicating the position of the head 310. The coordinates are, for example, represented by coordinate values in the robot coordinate system described above.

In addition, the first processing circuit 630 functions as a positional information output unit 631 that outputs the positional information D2 generated by the first processing circuit 630. In the present embodiment, the positional information D2 output from the positional information output unit 631 is input to the control module 500.

The first processing circuit 630 includes, for example, a processor such as one or more central processing units (CPUs). The first processing circuit 630 may include a programmable logic device such as a field-programmable gate array (FPGA) instead of or in addition to the CPUs.

The second processing circuit 640 controls operations of the joints 230_1 to 230_6 based on the calculation results of the first processing circuit 630. Specifically, the second processing circuit 640 performs, based on the signals D1_1 to D1_6 from the encoders 241_1 to 241_6 included in the arm drive mechanism 240 of the robot 200, feedback control to output control signals Sk_1 to Sk_6 to the joints 230_1 to 230_6 so that operational amounts such as the actual rotation angles and rotation speeds of the joints 230_1 to 230_6 are equal to the calculation results of the first processing circuit 630. The control signals Sk_1 to Sk_6 correspond to the joints 230_1 to 230_6 and control the driving of the motors provided for the corresponding joints 230. That is, the controller 600 controls the operation of the robot 200 based on the signals D1_1 to D1_6 from the encoders 241_1 to 241_6 included in the arm drive mechanism 240. The signals D1_1 to D1_6 correspond to the encoders 241_1 to 241_6. Each of the signals D1_1 to D1_6 may be hereinafter referred to as a signal D1.

The second processing circuit 640 is constituted by a circuit separate from the first processing circuit 630 described above. This prevents the processing load of the first processing circuit 630 from affecting the processing load of the second processing circuit 640. Similarly to the first processing circuit 630, the second processing circuit 640 may include a processor such as one or more central processing units (CPUs), for example. However, the second processing circuit 640 may have a control cycle shorter than that of the first processing circuit 630. By shortening the control cycle of the second processing circuit 640, it is possible to shorten the cycle of the feedback control for each of the joints 230_1 to 230_6 and improve the accuracy of the operation of the robot 200. The second processing circuit 640 may include a device that can perform computation, such as a field-programmable gate array (FPGA) or a digital signal processor (DSP), from the viewpoint of making the control cycle of the second processing circuit 640 shorter than the control cycle of the first processing circuit 630.

As described above, the controller 600 may have the two different control cycles, the control cycle of the first processing circuit 630 and the control cycle of the second processing circuit 640. However, in the following description, these control cycles are not distinguished from each other, and each of the control cycles is referred to as a control cycle C2.

The control module 500 is a circuit that controls the ejection operation of the head 310 based on the positional information D2 output from the controller 600 and print data from the computer 700. The control module 500 includes a timing signal generating circuit 510, a power supply circuit 520, a control circuit 530, and a drive signal generating circuit 540.

The timing signal generating circuit 510 generates a timing signal PTS based on the positional information D2. The timing signal generating circuit 510 functions as a timing adjuster 511 that adjusts, based on the positional information D2, the timing of ejecting the ink from the head 310. The timing signal generating circuit 510 is constituted by a device that can perform computation, such as a field-programmable gate array (FPGA) or a digital signal processor (DSP), for example. Although described later in detail, the timing signal PTS defines the timing of operating the head 310 and is a so-called pulse timing signal.

The power supply circuit 520 receives power supplied from a commercial power supply not illustrated and generates predetermined various potentials. The generated various potentials are supplied to the units of the printing device 100 as appropriate. For example, the power supply circuit 520 generates a power supply potential VHV and an offset potential VBS. The offset potential VBS is supplied to the head unit 300. The power supply potential VHV is supplied to the drive signal generating circuit 540.

The control circuit 530 generates a control signal SI, a waveform specifying signal dCom, a latch signal LAT, a clock signal CLK, and a change signal CNG based on the timing signal PTS. The signals generated by the control circuit 530 are synchronized with the timing signal PTS. Among the signals generated by the control circuit 530, the waveform specifying signal dCom is input to the drive signal generating circuit 540, and the other signals are input to a switch circuit 340 of the head unit 300.

The control signal SI is a digital signal for specifying operational states of the piezoelectric elements 311 included in the head 310. Specifically, the control signal SI specifies whether a drive signal Com described later is supplied to the piezoelectric elements 311. This specifying specifies whether the ink is ejected from the nozzles corresponding to the piezoelectric elements 311, and specifies amounts of the ink to be ejected from the nozzles, for example. The waveform specifying signal dCom is a digital signal defining the waveform of the drive signal Com. The latch signal LAT and the change signal CNG are used together with the control signal SI to define the timing of driving the piezoelectric elements 311, thereby defining the timing of ejecting the ink from the nozzles. As described above, since each of the latch signal LAT and the change signal CNG is synchronized with the timing signal PTS, it can be said that the timing signal PTS defines the ejection timing. The clock signal CLK is synchronized with the timing signal PTS and serves as a reference. Among the signals described above, signals to be input to the switch circuit 340 of the head unit 300 are described later.

The drive signal generating circuit 540 generates the drive signal Com for driving each of the piezoelectric elements 311 included in the head 310. Specifically, the drive signal generating circuit 540 includes a DA conversion circuit and an amplifying circuit, for example. In the drive signal generating circuit 540, the DA conversion circuit converts the waveform specifying signal dCom from the control circuit 530 from a digital signal to an analog signal, and the amplifying circuit uses the power supply potential VHV from the power supply circuit 520 to amplify the analog signal so as to generate the drive signal Com. A signal of a waveform that is included in a waveform included in the drive signal Com and is to be supplied to the piezoelectric elements 311 is a drive pulse PD. The drive pulse PD is supplied to the piezoelectric elements 311 from the drive signal generating circuit 540 via the switch circuit 340. The switch circuit 340 switches, based on the control signal SI, whether at least a part of the waveform included in the drive signal Com is supplied as the drive pulse PD.

The computer 700 includes a function of supplying the route information Da to the controller 600 and a function of supplying the print data to the control module 500.

1-3. Head Unit

Figure 3:
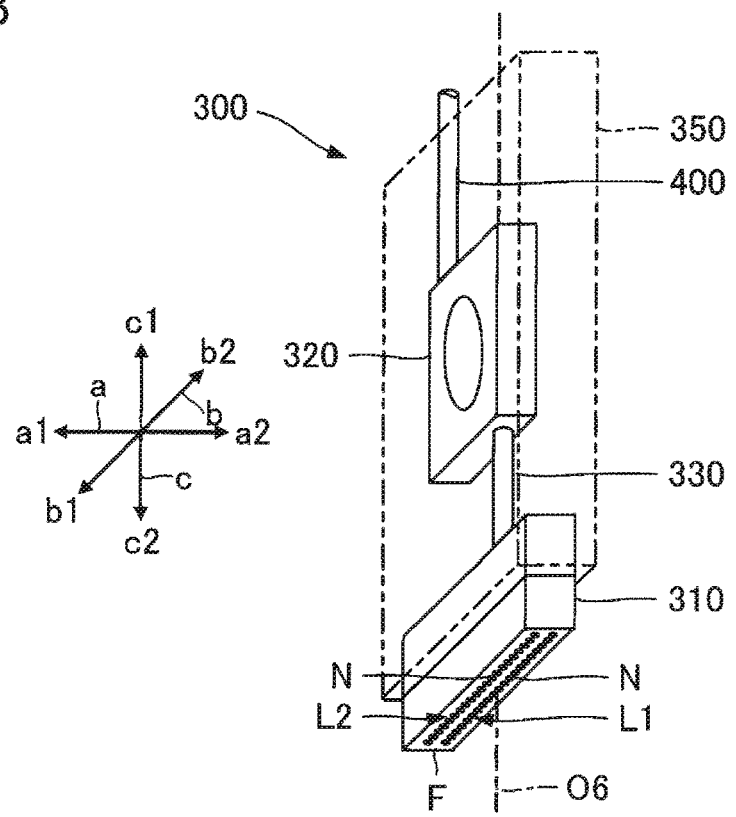
FIG. 3 is a perspective view illustrating a schematic configuration of a head unit according to the first embodiment.

FIG. 3 is a perspective view illustrating a schematic configuration of the head unit 300 according to the first embodiment. In the following description, an a axis, a b axis, and a c axis that intersect each other are used as appropriate. In addition, in the following description, one of directions along the a axis is an a1 direction, and the other direction opposite to the a1 axis is an a2 direction. Similarly, directions opposite to each other along the b axis are a b1 direction and a b2 direction. In addition, directions opposite to each other along the c axis are a c1 direction and a c2 direction.

The a, b, and c axes correspond to coordinate axes of a tool coordinate system set in the head unit 300. The operation of the robot 200 described above changes relationships of relative positions and orientations with the world coordinate system described above or the robot coordinate system described above. In the example illustrated in FIG. 3, the c axis is parallel to the sixth rotation axis O6 described above. The a, b, and c axes are typically perpendicular to each other but are not limited thereto. For example, the a, b, and c axes may intersect each other at an angle of 80° or greater and 100° or less.

The tool coordinate system is associated with the base coordinate system or the robot coordinate system by calibration. In addition, the tool coordinate system is set such that the center of a nozzle surface F described later serves as a reference (tool center point (TCP)), for example. The reference indicates the position of the head 310 in the base coordinate system or in the robot coordinate system.

The head unit 300 includes the head 310 and the pressure control valve 320, as described above. The head 310 and the pressure control valve 320 are held in a holding body 350 indicated by a double-dotted line in FIG. 3.

The holding body 350 is made of a metal material or the like and is a substantially rigid body, for example. In FIG. 3, the holding body 350 has a flat box shape. However, the shape of the holding body 350 is not particularly limited and is arbitrary.

The holding body 350 is attached to the distal end of the arm 220 described above, that is, to the arm 226. Therefore, each of the head 310 and the pressure control valve 320 is fixed to the arm 226. In the example illustrated in FIG. 3, the pressure control valve 320 is located in the c1 direction with respect to the head 310.

A supply flow path 400 not illustrated is coupled to the pressure control valve 320. The ink from the liquid reservoir not illustrated is supplied to the supply flow path 400 through the supply flow path 400. In addition, the pressure control valve 320 is coupled to the head 310 via a flow path member 330. The flow path member 330 is a tubular body through which the ink is supplied from the pressure control valve 320 to the head 310. The flow path member 330 is made of resin, for example.

The head 310 includes the nozzle surface F and the plurality of nozzles N open on the nozzle surface F. In the example illustrated in FIG. 3, a normal to the nozzle surface F is the c2 direction, and the plurality of nozzles N are divided into a first nozzle array L1 and a second nozzle array L2 that are arranged side by side at an interval in the direction along the a axis. Each of the first nozzle array L1 and the second nozzle array L2 is an example of a "nozzle array" and is a set of a plurality of nozzles N linearly arrayed in the direction along the b axis. Components related to the nozzles N of the first nozzle array L1 are substantially symmetrical to components related to the nozzles N of the second nozzle array L2 in the direction along the a axis in the head 310.

However, the positions of the plurality of nozzles N of the first nozzle array L1 in the direction along the b axis may match or be different from the positions of the plurality of nozzles N of the second nozzle array L2 in the direction along the b axis. In addition, the components related to the nozzles N of one of the first nozzle array L1 and the second nozzle array L2 may be omitted. A configuration in which the positions of the plurality of nozzles N of the first nozzle array L1 in the direction along the b axis match the positions of the plurality of nozzles N of the second nozzle array L2 in the direction along the b axis is exemplified below.

1-4. Operation of Printing Device

Figure 4:
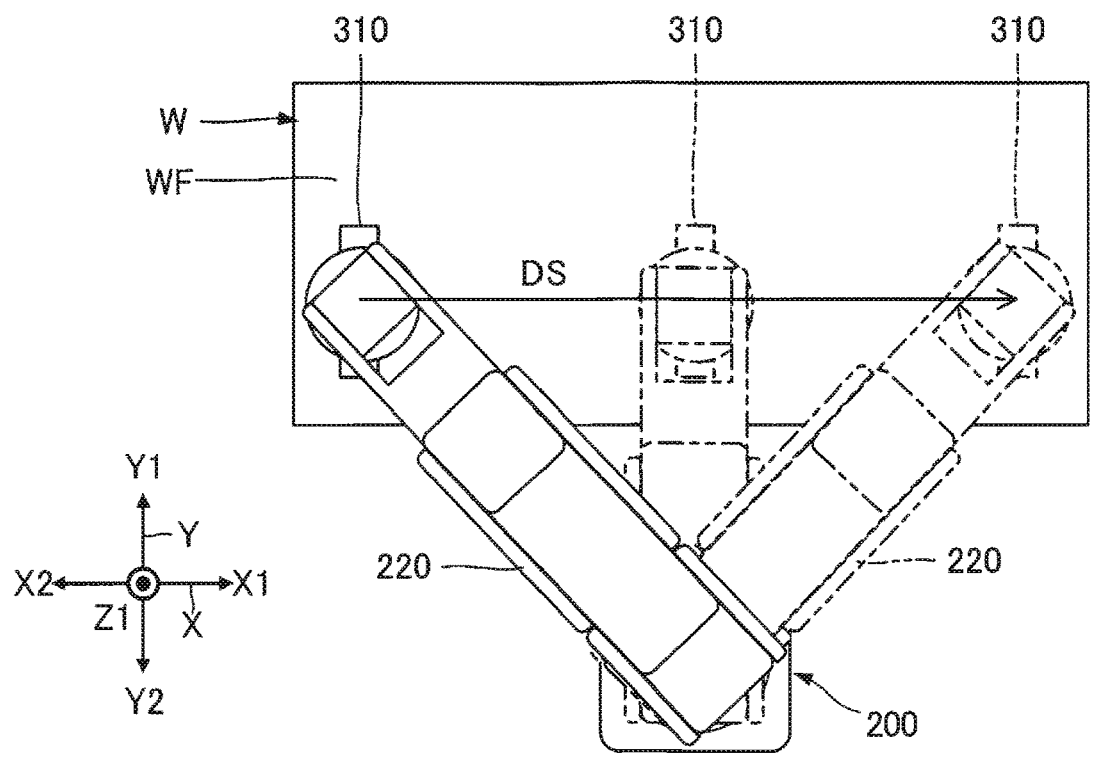
FIG. 4 is a diagram describing a printing operation of the printing device.

FIG. 4 is a diagram describing a printing operation of the printing device 100. FIG. 4 exemplifies a state in which the printing device 100 performs printing on the surface WF of the work W. As illustrated in FIG. 4, the printing device 100 performs the printing on the surface WF by ejecting the ink from the head 310 while the robot 200 moves the head 310 in a predetermined scan direction DS.

The scan direction DS is a direction along the route indicated by the route information Da described above. In the example illustrated in FIG. 4, the scan direction DS is the X1 direction. In addition, the a1 direction in the tool coordinate system is the scan direction DS. The scan direction DS is not limited to the example illustrated in FIG. 4 and is arbitrary. In addition, the shape of the route indicated by the route information Da is not limited to the example illustrated in FIG. 4 and is arbitrary.

In the printing operation, the control module 500 controls, based on the positional information D2, the timing of ejecting the ink from the head 310.

Figure 5:
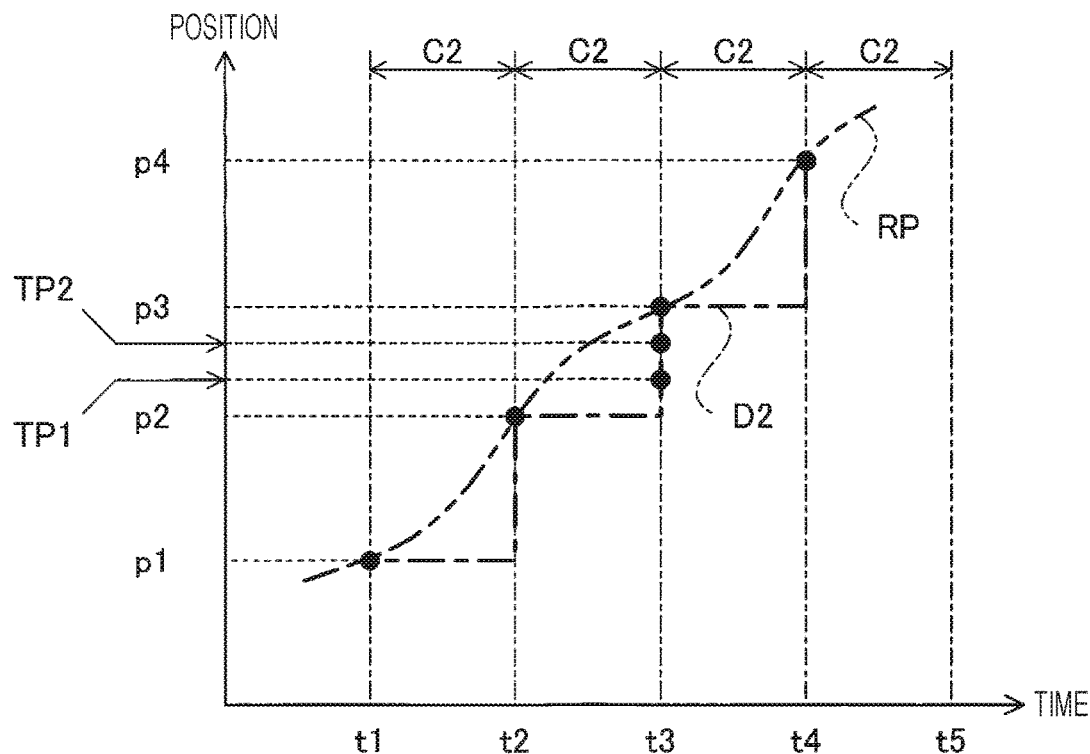
FIG. 5 is a diagram describing an ejection timing based on positional information when a timing adjuster does not perform adjustment as a comparative example.

FIG. 5 is a diagram describing an ejection timing based on positional information D2 when a timing adjuster 511 does not perform adjustment as a comparative example. In FIG. 5, the horizontal axis indicates time and the vertical axis indicates the position.

The positional information D2 is updated in each control cycle C2 of a positional information output unit 631 according to the comparative example. Therefore, a position indicated by the positional information D2 output from the positional information output unit 631 changes step by step in each control cycle C2, as illustrated in FIG. 5. As a result, the position indicated by the positional information D2 has an error with respect to the actual position RP of a head 310 according to the comparative example.

FIG. 5 representatively illustrates timings t1 to t5 as the timing of updating the positional information D2. In the example illustrated in FIG. 5, in a time period between the timing t1 and the timing t2, the positional information D2 indicates a position p1. In a time period between the timing t2 and the timing t3, the positional information D2 indicates a position p2. In a time period between the timing t3 and the timing t4, the positional information D2 indicates a position p3. In a time period between the timing t4 and the timing t5, the positional information D2 indicates a position p4.

It is determined, based on the position indicated by the positional information D2, whether the head 310 according to the comparative example reached an ejection position where ink is to be ejected. However, when the timing adjuster 511 according to the comparative example does not adjust the ejection timing, the timing of ejecting the ink cannot be accurately determined, and as a result, the ink cannot be ejected at a desired ejection position. For example, as illustrated in FIG. 5, even when the head 310 according to the comparative example tries to eject the ink at different ejection positions TP1 and TP2 between the position p2 and the position p3, both ejection timings are the timing t3. As a result, both actual ejection positions are the position p3.

That is, a timing signal generating circuit 510 according to the comparative example uses positional information D2 as it is to generate a timing signal PTS. Therefore, the error of the position indicated by the positional information D2 described above is reflected in the timing of the timing signal PTS. As a result, due to an error in the ejection timing, the ejection position varies.

Figure 6:
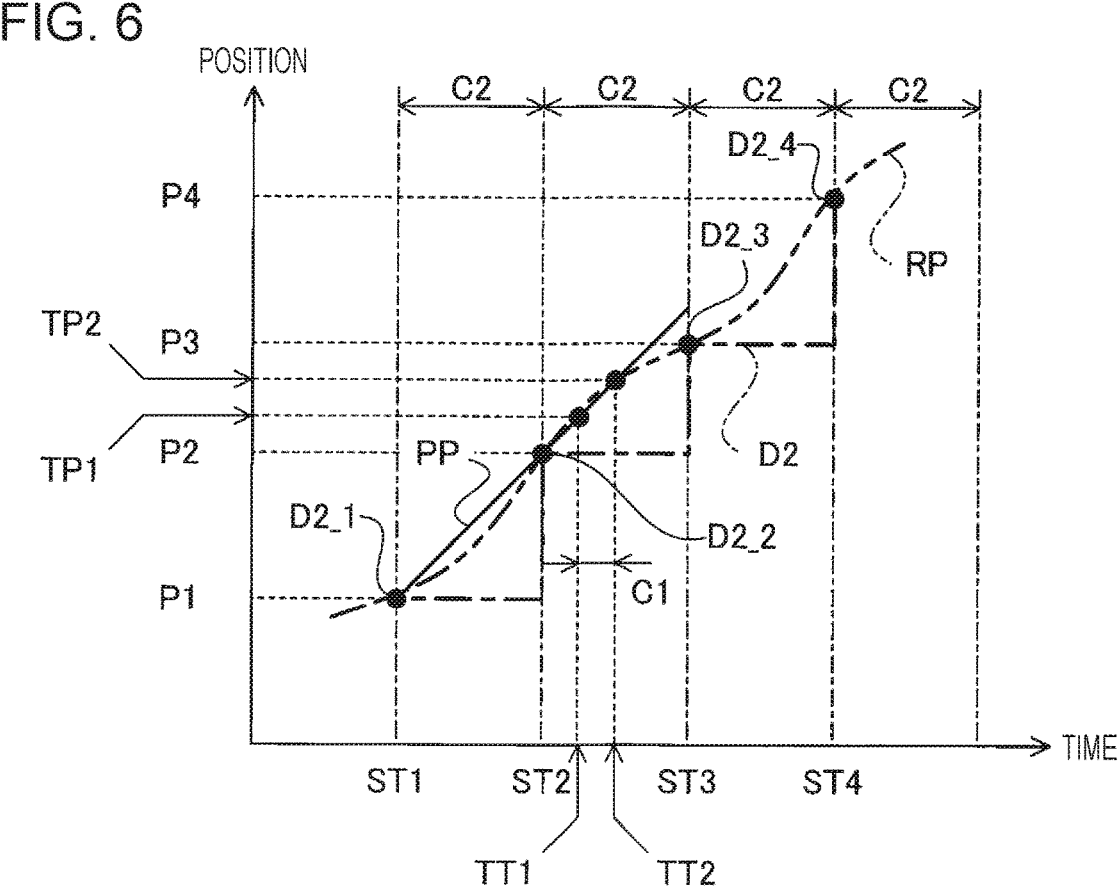
FIG. 6 is a diagram describing an ejection timing based on a position predicted by a timing adjuster according to the first embodiment.

FIG. 6 is a diagram describing the ejection timing based on a position PP predicted by the timing adjuster 511 according to the first embodiment. In FIG. 6, the horizontal axis indicates time and the vertical direction indicates the position.

The timing adjuster 511 acquires first positional information D2_1 as the positional information D2 at a first acquisition timing ST1. After the first acquisition timing ST1, the timing adjuster 511 acquires second positional information D2_2 as the positional information D2 at a second acquisition timing ST2. After the second acquisition timing ST2, the timing adjuster 511 acquires third positional information D2_3 as the positional information D2 at a third acquisition timing ST3. After the third acquisition timing ST3, the timing adjuster 511 acquires fourth positional information D2_4 as the positional information D2 at a fourth acquisition timing ST4.

The first acquisition timing ST1 corresponds to the timing t1 illustrated in FIG. 5 described above. A position P1 indicated by the first positional information D2_1 corresponds to the position p1 illustrated in FIG. 5 described above. Similarly, the second acquisition timing ST2, the third acquisition timing ST3, and the fourth acquisition timing ST4 correspond to the timings t2, t3, and t4 illustrated in FIG. 5 described above, respectively. Positions P2, P3, and P4 indicated by the second positional information D2_2, the third positional information D2_3, and the fourth positional information D2_4 correspond to the positions p2, p3, and p4 illustrated in FIG. 5 described above, respectively.

Therefore, a time interval between the first acquisition timing ST1 and the second acquisition timing ST2 is equal to the control cycle C2 of the positional information output unit 631. Similarly, a time interval between the second acquisition timing ST2 and the third acquisition timing ST3 is equal to the control cycle C2. A time interval between the third acquisition timing ST3 and the fourth acquisition timing ST4 is equal to the control cycle C2. In this case, "equal" means that the time intervals are exactly equal to the control cycle C2 and that differences between the time intervals and the control cycle C2 may be equal to or less than 1/10 of the control cycle C2.

The timing adjuster 511 adjusts, based on the positional information D2, the timing of ejecting the ink from the head 310. The adjustment is performed in each control cycle C2. Regarding this adjustment, an example in which the ink is ejected at the different ejection positions TP1 and TP2 between the position P2 and the position P3 is described below.

In this case, the timing of ejecting the ink at the ejection position TP1 is a first ejection timing TT1 and the timing of ejecting the ink at the ejection position TP2 is a second ejection timing TT2. A time interval between the second acquisition timing ST2 and the first ejection timing TT1 is shorter than the control cycle C2, and a time interval between the second acquisition timing ST2 and the second ejection timing TT2 is shorter than the control cycle C2.

Therefore, the first ejection timing TT1 and the second ejection timing TT2 are between the second acquisition timing ST2 and the third acquisition timing ST3. A time interval between the first ejection timing TT1 and the second ejection timing TT2 corresponds to an ejection cycle C1.

The timing adjuster 511 adjusts, based on the first positional information D2_1 and the second positional information D2_2, the first ejection timing TT1 that is after the second acquisition timing ST2.

Specifically, first, the timing adjuster 511 calculates, based on the first positional information D2_1 and the second positional information D2_2, a predicted position PP of the head 310 after the second acquisition timing ST2. Next, the timing adjuster 511 determines, based on the predicted position PP, whether the head 310 reached the ejection position TP1. When the timing adjuster 511 determines that the head 310 reached the ejection position TP1, the timing adjuster 511 determines the first ejection timing TT1. Then, the timing adjuster 511 outputs the timing signal PTS synchronized with the first ejection timing TT1.

In the example illustrated in FIG. 6, the predicted position PP is represented by a linear function indicating a relationship between the timing and the position after the second acquisition timing ST2. The linear function is calculated based on the first acquisition timing ST1, the second acquisition timing ST2, the position P1, and the position P2. The predicted position PP may be calculated using the positional information D2 obtained before the first positional information D2_1 in addition to the first positional information D2_1 and the second positional information D2_2. In addition, the predicted position PP is not limited to the example represented by the linear function and may be represented by a quadratic function or the like or may be represented by using a known prediction method, for example.

Similarly, the timing adjuster 511 adjusts, based on the first positional information D2_1 and the second positional information D2_2, the second ejection timing TT2 that is an ejection timing subsequent to the first ejection timing TT1.

Specifically, the timing adjuster 511 determines, based on the predicted position PP described above, whether the head 310 reached the ejection position TP2. When the timing adjuster 511 determines that the head 310 reached the ejection position TP2, the timing adjuster 511 determines the second ejection timing TT2. Then, the timing adjuster 511 outputs the timing signal PTS synchronized with the second ejection timing TT2.

Figure 7:
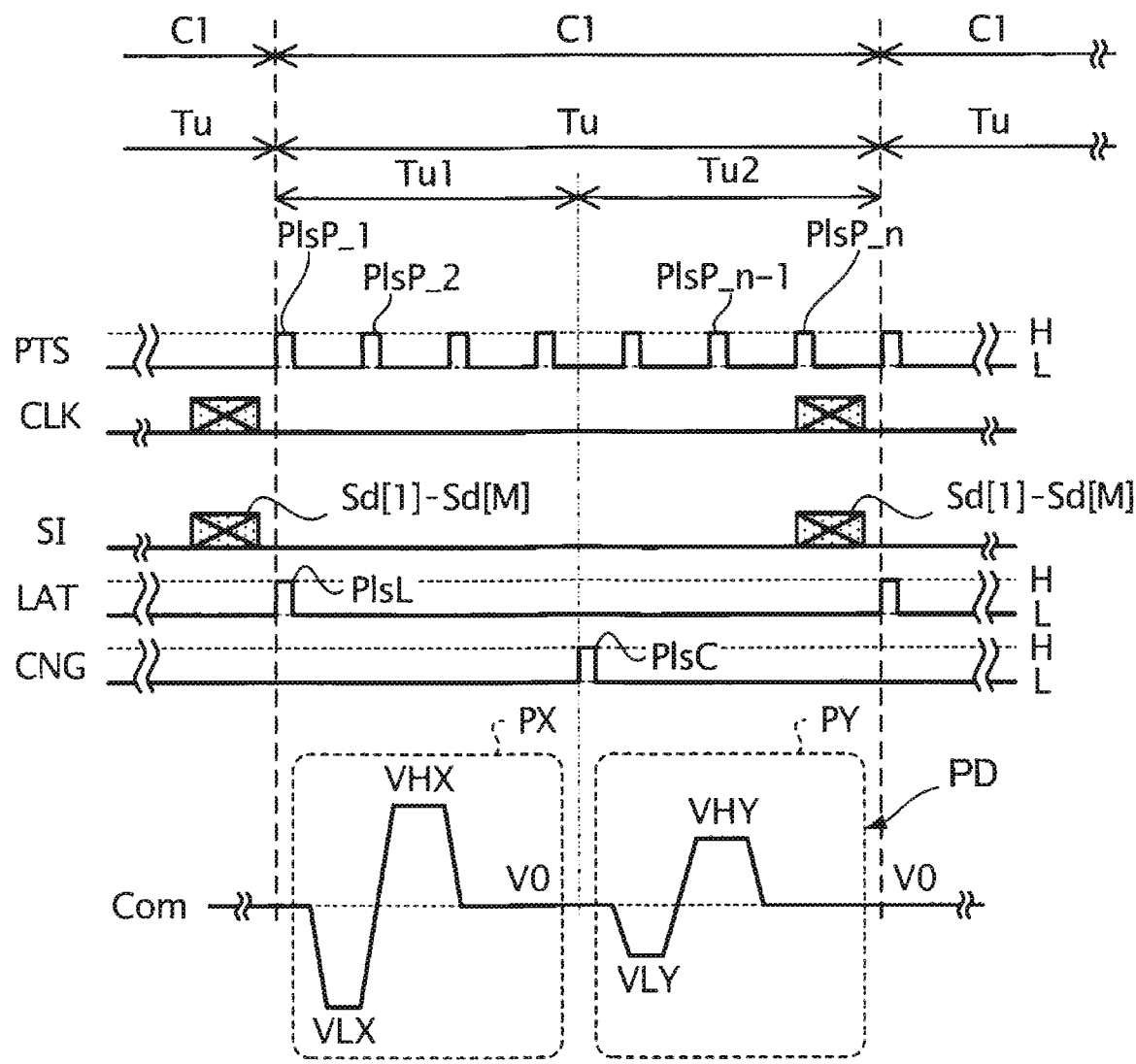
FIG. 7 is a timing chart describing an operation of a switch circuit.

FIG. 7 is a timing chart describing the operation of the switch circuit 340. As illustrated in FIG. 7, the timing signal PTS includes a number n of pulses PlsP in each unit time period Tu. In this case, n is a natural number of 1 or greater. An example illustrated in FIG. 7 indicates a case where n is 7. In FIG. 7, the number n of pulses PlsP are represented by pulses PlsP_1 to PlsP_n. Note that n is not limited to the example illustrated in FIG. 7. For example, n is preferably in a range of 1 or greater and 20 or less, more preferably in a range of 5 or greater and 10 or less.

The unit time period Tu corresponds to the ejection cycle C1 described above, for example. However, the pulses PlsP may be output at a timing shifted from a pulse PlsL of the latch signal LAT described later. When the number n of pulses PlsP in each unit time period Tu is 1, the control circuit 530 described above may output, as the latch signal LAT, the timing signal PTS as it is, or may output the timing signal PTS as the latch signal LAT at timings shifted from each other. As an example different from the example illustrated in FIG. 7, the control circuit 530 may output a plurality of pulses PlsL of the latch signal LAT for one pulse PlsP of the timing signal PTS.

The latch signal LAT includes pulses PlsL for defining the unit time period Tu. The unit time period Tu is, for example, defined as a time period from the rising of a pulse PlsL to the rising of the next pulse PlsL. In addition, the change signal CNG includes a pulse PlsC for dividing the unit time period Tu into a control period Tu1 and a control period Tu2. The control period Tu1 is, for example, a time period from the rising of the pulse PlsL to the rising of the pulse PlsC. The control period Tu2 is, for example, a time period from the rising of the pulse PlsC to the rising of the next pulse PlsL.

The control signal SI includes individual specifying signals Sd[1] to Sd[M] specifying types of operations of the piezoelectric elements 311[1] to 311[M] in each unit time period Tu. The individual specifying signals Sd[1] to Sd[M] are supplied to the switch signal 340 in synchronization with the clock signal CLK before each unit time period Tu. The switch circuit 340 is switched on and off based on an individual specifying signal Sd[m] in the unit time period Tu. M is the number of piezoelectric elements 311 and m is a natural number of 1 or greater and M or less. The suffix [M] or [m] is a notation for distinguishing the number M of piezoelectric elements 311. In the following description, the suffix [m] may be used for a number M of other elements and may indicate a correspondence relationship with a piezoelectric element 311[m] among the plurality of piezoelectric elements 311.

The drive signal Com has a waveform Px in the control period Tu1 and a waveform Px in the control period Tu2. In the example illustrated in FIG. 7, a potential difference between the highest potential VHX of the waveform PX and the lowest potential VLX of the waveform PX is larger than a potential difference between the highest potential VHY of the waveform PY and the lowest potential VLY of the waveform PY. The waveform of the drive signal Com is not limited to the example illustrated in FIG. 7. For example, the waveform PY may be omitted.

When the individual specifying signal Sd[m] indicates a value specifying the formation of a middle dot, the switch circuit 340 is on in the control period Tu1 and is off in the control period Tu2. Therefore, only the waveform PX of the drive signal Com is supplied as a drive pulse PD to the piezoelectric element 311[m]. As a result, the ink in an amount corresponding to the middle dot is ejected from the nozzle corresponding to the piezoelectric element 311[m].

When the individual specifying signal Sd[m] indicates a value specifying the formation of a small dot, the switch circuit 340 is off in the control period Tu1 and is on in the control period Tu2. Therefore, only the waveform PY of the drive signal Com is supplied as a drive pulse PD to the piezoelectric element 311[m]. As a result, the ink in an amount corresponding to the small dot is ejected from the nozzle corresponding to the piezoelectric element 311[m].

When the individual specifying signal Sd[m] indicates a value specifying the formation of a large dot, the switch circuit 340 is on in the control periods Tu1 and Tu2. Therefore, the waveforms PX and PY of the drive signal Com are supplied as a drive pulse PD to the piezoelectric element 311[m]. As a result, the ink in an amount corresponding to the large dot is ejected from the nozzle corresponding to the piezoelectric element 311[m].

When the individual specifying signal Sd[m] indicates a value specifying non-ejection of ink, the switch circuit 340 is off in the control periods Tu1 and Tu2. Therefore, the waveforms PX and PY of the drive signal Com are not supplied to the piezoelectric element 311[m]. As a result, the ink is not ejected from the nozzle corresponding to the piezoelectric element 311[m].

In this manner, the ink is ejected from the nozzle at a timing based on the timing signal PTS.

As described above, the printing device 100 includes the head 310, the robot 200, the positional information output unit 631, and the timing adjuster 511. The head 310 ejects the ink onto the work W. The ink is an example of "liquid". The robot 200 changes relative positions of the work W and the head 310. The positional information output unit 631 outputs the positional information D2 regarding the position of the robot 200. The timing adjuster 511 adjusts, based on the positional information D2, the timing of ejecting the ink from the head 310.

The timing adjuster 511 adjusts the first ejection timing TT1 based on the first positional information D2_1 and the second positional information D2_2. The first acquisition timing ST1 is when the timing adjuster 511 acquires the first positional information D2_1 as the positional information D2. The second acquisition timing ST2 is when the timing adjuster 511 acquires the second positional information D2_2 as the positional information D2 after the first acquisition timing ST1. The first ejection timing TT1 is after the second acquisition timing ST2.

The printing device 100 can predict the first ejection timing TT1 based on the first positional information D2_1 and the second positional information D2_2. Therefore, by adjusting the first ejection timing TT1 based on the first positional information D2_1 and the second positional information D2_2, the first ejection timing TT1 when the ink can be ejected at a desired timing can be obtained regardless of the acquisition timing. In other words, the timing of ejecting the ink by the head 310 is not limited by the control cycle C2 of the controller 600. As described above, by operating the head 310 at a desired timing, it is possible to cause the ink to land at an appropriate position on the surface WF of the work W and improve the quality of the printing by the printing device 100.

As described above, the printing device 100 includes the controller 600 that is an example of the "robot controller". The controller 600 includes the positional information output unit 631 and controls the operation of the robot 200. Therefore, the positional information output unit 631 can be implemented using the controller 600.

As described above, the robot 200 includes the joints 230, which are an example of a number N (N is a natural number of 2 or greater) of "movable portions", and the number N of encoders 241. The number N of encoders 241 are provided corresponding to the number N of joints 230 and measure operational amounts of the joints 230. In the present embodiment, N is 6. The controller 600 calculates coordinates indicating the position of the head 310 based on signals from the number N of encoders 241. Then, the positional information output unit 631 outputs information regarding the coordinates as the positional information D2. Therefore, the positional information output unit 631 can be implemented using the controller 600. The output from the controller 600 can be used as it is as the positional information D2.

As described above, the printing device 100 includes the control module 500 that is an example of the "head driving unit". The control module 500 drives the head 310. The timing adjuster 511 outputs the timing signal PTS defining the ejection timing. Then, the control module 500 drives the head 310 at a timing based on the timing signal PTS. Therefore, the control module 500 can drive the head 310 at the ejection timing after the adjustment by the timing adjuster 511.

As described above, when the time interval between the first acquisition timing ST1 and the second acquisition timing ST2 is equal to the control cycle C2 of the positional information output unit 631, the timing of acquiring the positional information D2 by the timing adjuster 511 can be matched with the control cycle C2 of the controller 600. As a result, the timing adjuster 511 can efficiently acquire the positional information D2.

In the present embodiment, as described above, the time interval between the second acquisition timing ST2 and the first ejection timing TT1 is shorter than the control cycle C2. Therefore, it is possible to eject the ink in the control cycle C2 after the acquisition of the positional information D2 by the timing adjuster 511. In other words, it is possible to eject the ink at an ejection timing when the latest positional information D2 is used.

As described above, when an ejection timing subsequent to the first ejection timing TT1 is the second ejection timing TT2, the timing adjuster 511 adjusts the second ejection timing TT2 based on the first positional information D2_1 and the second positional information D2_2. Therefore, even in a state in which the positional information D2 is not updated in the control cycle C2 after the second acquisition timing ST2, it is possible to eject the ink at the second ejection timing TT2 after the ejection of the ink at the first ejection timing TT1.

As described above, the time interval between the second acquisition timing ST2 and the second ejection timing TT2 is shorter than the control cycle C2. Therefore, it is possible to eject the ink at the second ejection timing TT2 in the control cycle C2 after the second acquisition timing ST2.

In addition, as described above, when the timing of acquiring the third positional information D2_3 as the positional information D2 by the timing adjuster 511 after the second acquisition timing ST2 is the third acquisition timing ST3, each of the first ejection timing TT1 and the second ejection timing TT2 is between the second acquisition timing ST2 and the third acquisition timing ST3. Therefore, the ejection cycle C1 in which the ink is ejected can be shorter than the control cycle C2. As a result, even when a controller with a long control cycle due to low specifications is used or a signal line with a long control cycle is used, high-speed printing can be performed at a highly accurate ejection timing.

In addition, as described above, when the time interval between the second acquisition timing ST2 and the third acquisition timing ST3 is equal to the control cycle C2 of the positional information output unit 631, the timing of acquiring the positional information D2 by the timing adjuster 511 can be matched with the control cycle C2 of the positional information output unit 631. As a result, the timing adjuster 511 can efficiently acquire the positional information D2.

2. Second Embodiment

A second embodiment of the present disclosure is described below. In the second embodiment exemplified below, components that have the same effects and functions as those described in the first embodiment are denoted by the reference signs used in the description of the first embodiment and will not be described in detail.

Figure 8:
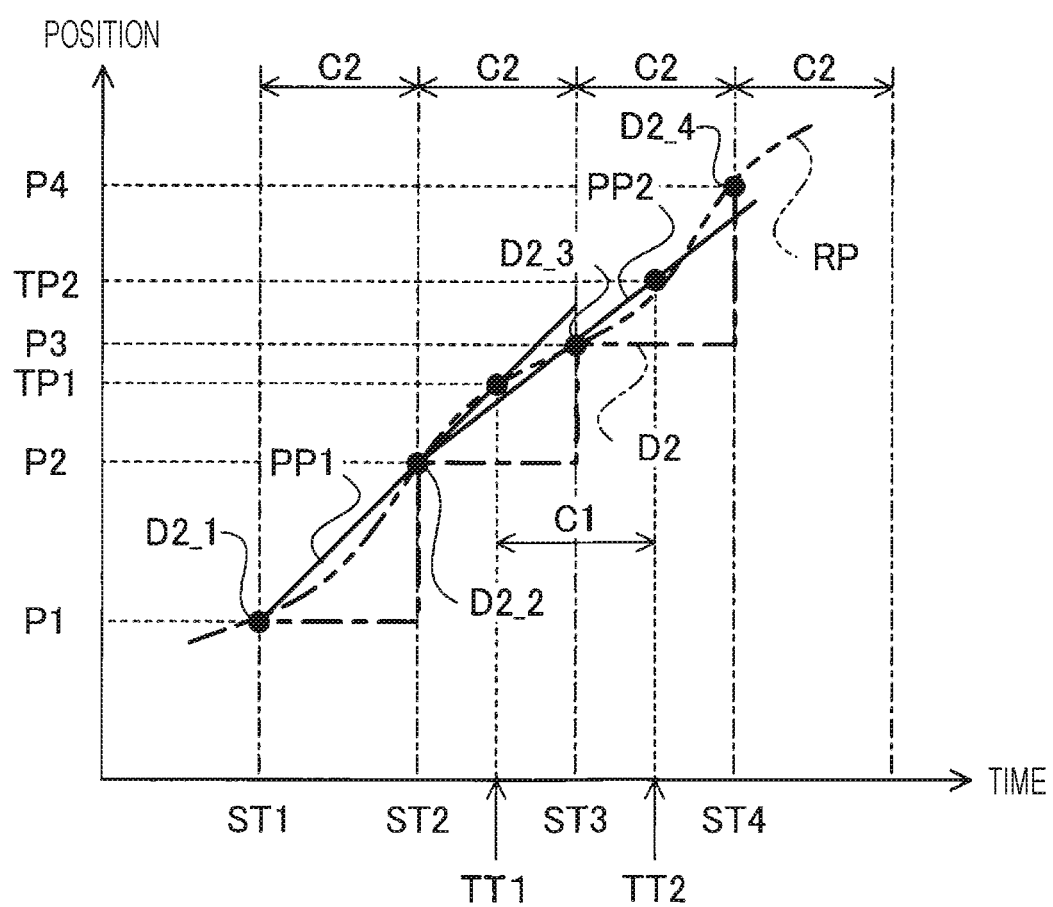
FIG. 8 is a diagram describing an ejection position based on a position predicted by a timing adjuster according to a second embodiment.

FIG. 8 is a diagram describing ejection positions TP1 and TP2 based on positions PP1 and PP2 predicted by a timing adjuster 511 according to the second embodiment. The second embodiment is the same as the first embodiment except that the ejection position TP1 is between a position P2 and a position P3.

Specifically, first, the timing adjuster 511 calculates, based on first positional information D2_1 and second positional information D2_2, the predicted position PP1 of a head 310 after a second acquisition timing ST2. The predicted position PP1 is the same as the predicted position PP described above. Next, the timing adjuster 511 determines, based on the predicted position PP1, whether the head 310 reached the ejection position TP1. When the timing adjuster 511 determines that the head 310 reached the ejection position TP1, the timing adjuster 511 determines a first ejection timing TT1. Then, the timing adjuster 511 outputs a timing signal PTS synchronized with the first ejection timing TT1.

Thereafter, the timing adjuster 511 calculates, based on the second positional information D2_2 and third positional information D2_3, the predicted position PP2 of the head 310 after a third acquisition timing ST3. Next, the timing adjuster 511 determines, based on the predicted position PP2, whether the head 310 reached the ejection position TP2. When the timing adjuster 511 determines that the head 310 reached the ejection position TP2, the timing adjuster 511 determines a second ejection timing TT2. Then, the timing adjuster 511 outputs the timing signal PTS synchronized with the second ejection timing TT2.

In the example illustrated in FIG. 8, the predicted position PP2 is represented by a linear function indicating a relationship between the timing and the position after the third acquisition timing ST3. The linear function is calculated based on the second acquisition timing ST2, the third acquisition timing ST3, the position P2, and the position P3. The predicted position PP2 may be calculated using positional information D2 such as the first positional information D2_1 obtained before the second positional information D2_2 in addition to the second positional information D2_2 and the third positional information D2_3. In addition, the predicted position PP2 is not limited to the example represented by the linear function and may be represented by a quadratic function or the like or may be represented using an existing prediction method, for example.

Even in the second embodiment, the head 310 can be operated at a desired timing. In the present embodiment, as described above, when the timing of acquiring the third positional information D2_3 as the positional information D2 by the timing adjuster 511 after the second acquisition timing ST2 is the third acquisition timing ST3, and an ejection timing subsequent to the first ejection timing TT1 is the second ejection timing TT2, the third acquisition timing ST3 is after the first ejection timing TT1 and before the second ejection timing TT2. Then, the timing adjuster 511 adjusts the second ejection timing TT2 based on the second positional information D2_2 and the third positional information D2_3. Therefore, the timing adjuster 511 can adjust the ejection timing for each update of the positional information D2.

In addition, as described above, the time interval between the second acquisition timing ST2 and the third acquisition timing ST3 is equal to the control cycle C2 of the positional information output unit 631. Therefore, the timing of acquiring the positional information D2 by the timing adjuster 511 can be matched with the control cycle C2 of the controller 600. As a result, the timing adjuster 511 can efficiently acquire the positional information D2.

Furthermore, as described above, when the time interval between the first ejection timing TT1 and the second ejection timing TT2 is equal to or longer than the control cycle C2 of the positional information output unit 631, the ink ejection cycle C1 can be longer than the control cycle C2. As a result, the ejection timing can be adjusted with high accuracy.

3. Third Embodiment

A third embodiment of the present disclosure is described below. In the third embodiment exemplified below, components that have the same effects and functions as those described in the first embodiment are denoted by the reference signs used in the description of the first or second embodiment and will not be described in detail.

Figure 9:
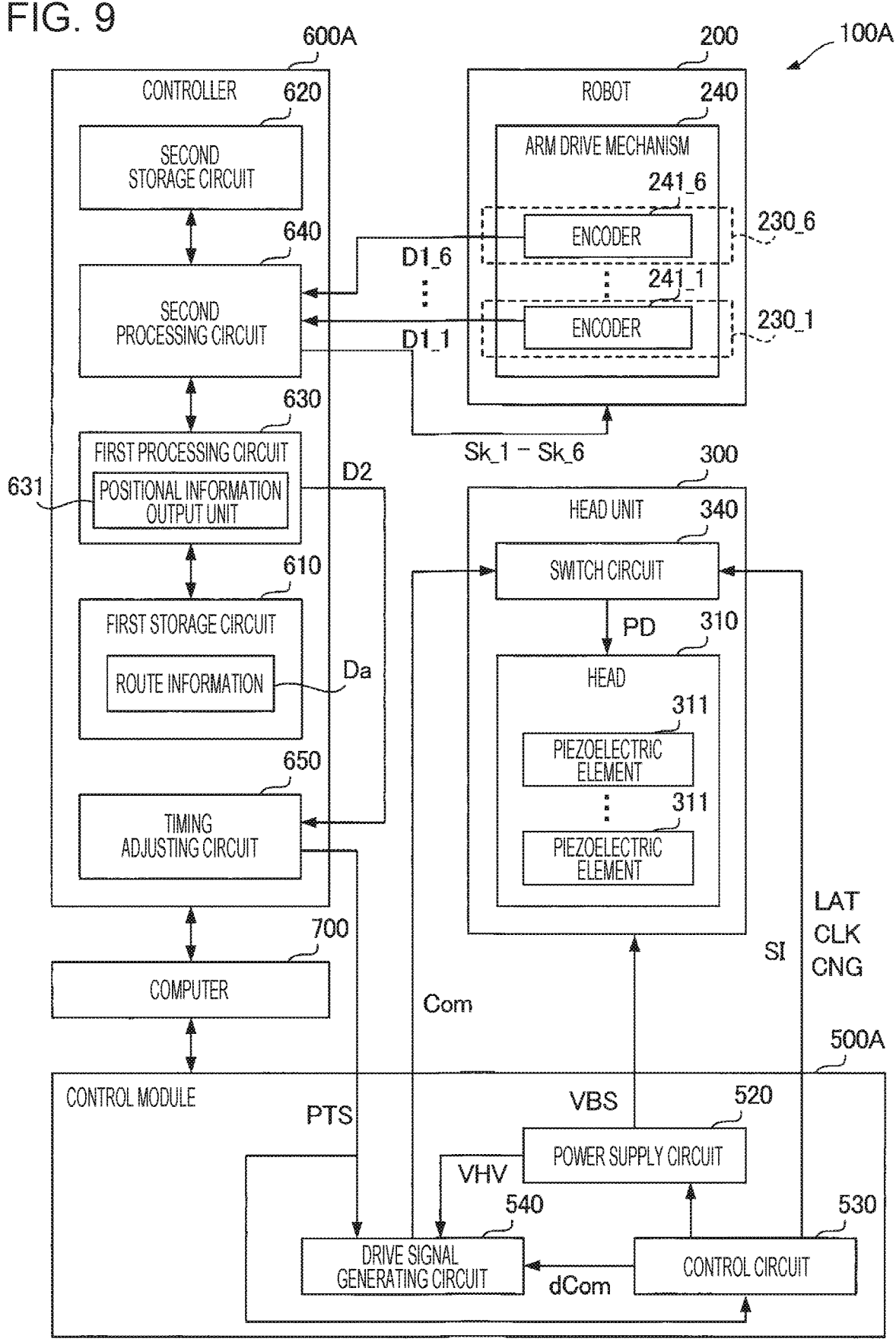
FIG. 9 is a block diagram illustrating an electrical configuration of a printing device according to a third embodiment.

FIG. 9 is a block diagram illustrating an electrical configuration of a printing device 100A according to the third embodiment. The printing device 100A has the same configuration as that of the printing device 100 according to the first embodiment except that the printing device 100A includes a control module 500A and a controller 600A instead of the control module 500 and the controller 600. The control module 500A is an example of the "head driving unit". The control module 500A has the same configuration as that of the control module 500 except that the control module 500A does not include the timing signal generating circuit 510. The controller 600A is an example of the "robot controller". The controller 600A has the same configuration as that of the controller 600 except that a timing adjusting circuit 650 is added to the controller 600A.

The timing adjusting circuit 650 is an example of a "timing adjuster". The timing adjusting circuit 650 has a configuration similar to that of the timing signal generating circuit 510 according to the first embodiment. The timing adjusting circuit 650 is configured as a circuit separate from a second processing circuit 640. Therefore, the control cycle of the timing adjusting circuit 650 can be shorter than the control cycle of the second processing circuit 640.

Even in the third embodiment, a head 310 can be operated at a desired timing. The timing adjusting circuit 650 may adjust a second ejection timing TT2 based on second positional information D2_2 and third positional information D2_3 in a similar manner to the second embodiment.

4. Fourth Embodiment

A fourth embodiment of the present disclosure is described below. In the fourth embodiment exemplified below, components that have the same effects and functions as those described in the first embodiment are denoted by the reference signs used in the first to third embodiments and will not be described in detail.

Figure 10:
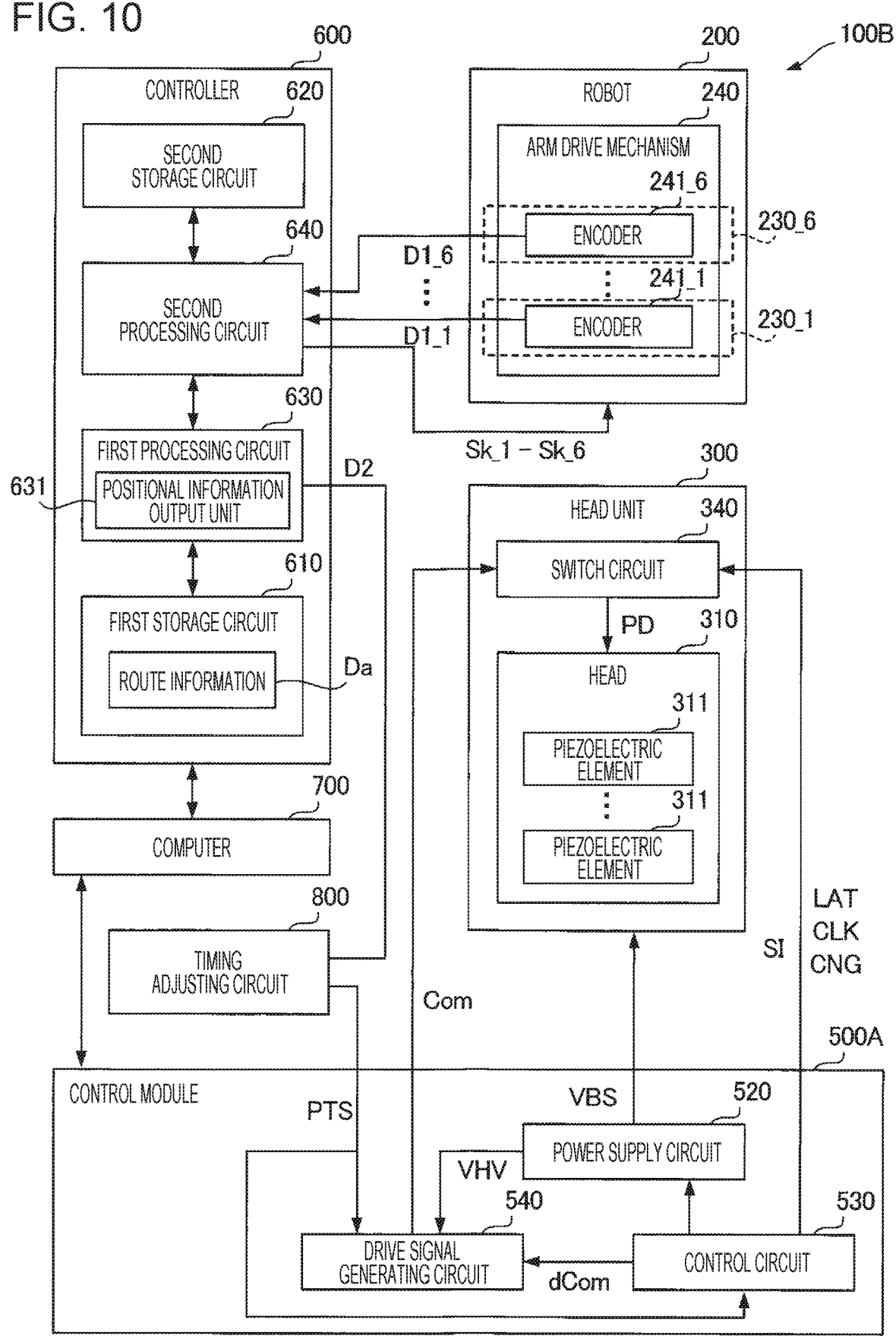
FIG. 10 is a block diagram illustrating an electrical configuration of a printing device according to a fourth embodiment.

FIG. 10 is a block diagram illustrating an electrical configuration of a printing device 100B according to the fourth embodiment. The printing device 100B has the same configuration as that of the printing device 100 according to the first embodiment except that the printing device 100B includes a control module 500A instead of the control module 500 and includes a timing adjusting circuit 800 added thereto. In other words, the printing device 100B has the same configuration as those of the printing device 100A according to the third embodiment except that the printing device 100B includes the controller 600 instead of the controller 600A and includes the timing adjusting circuit 800 added thereto.

The timing adjusting circuit 800 is an example of the "timing adjuster" and is provided independently of the controller 600 and the control module 500A. A function of the timing adjusting circuit 800 is the same as or similar to the function of the timing signal generating circuit 510 according to the first embodiment or is the same as or similar to the function of the timing adjusting circuit 650 according to the third embodiment.

Even in the fourth embodiment, a head 310 can be operated at a desired timing. The timing adjusting circuit 800 may adjust a second ejection timing TT2 based on second positional information D2_2 and third positional information D2_3 in a similar manner to the second embodiment.

5. Fifth Embodiment

A fifth embodiment of the present disclosure is described below. In the fifth embodiment exemplified below, components that have the same effects and functions as those described in the first embodiment are denoted by the reference signs used in the description of the first embodiment and will not be described in detail.

Figure 11:
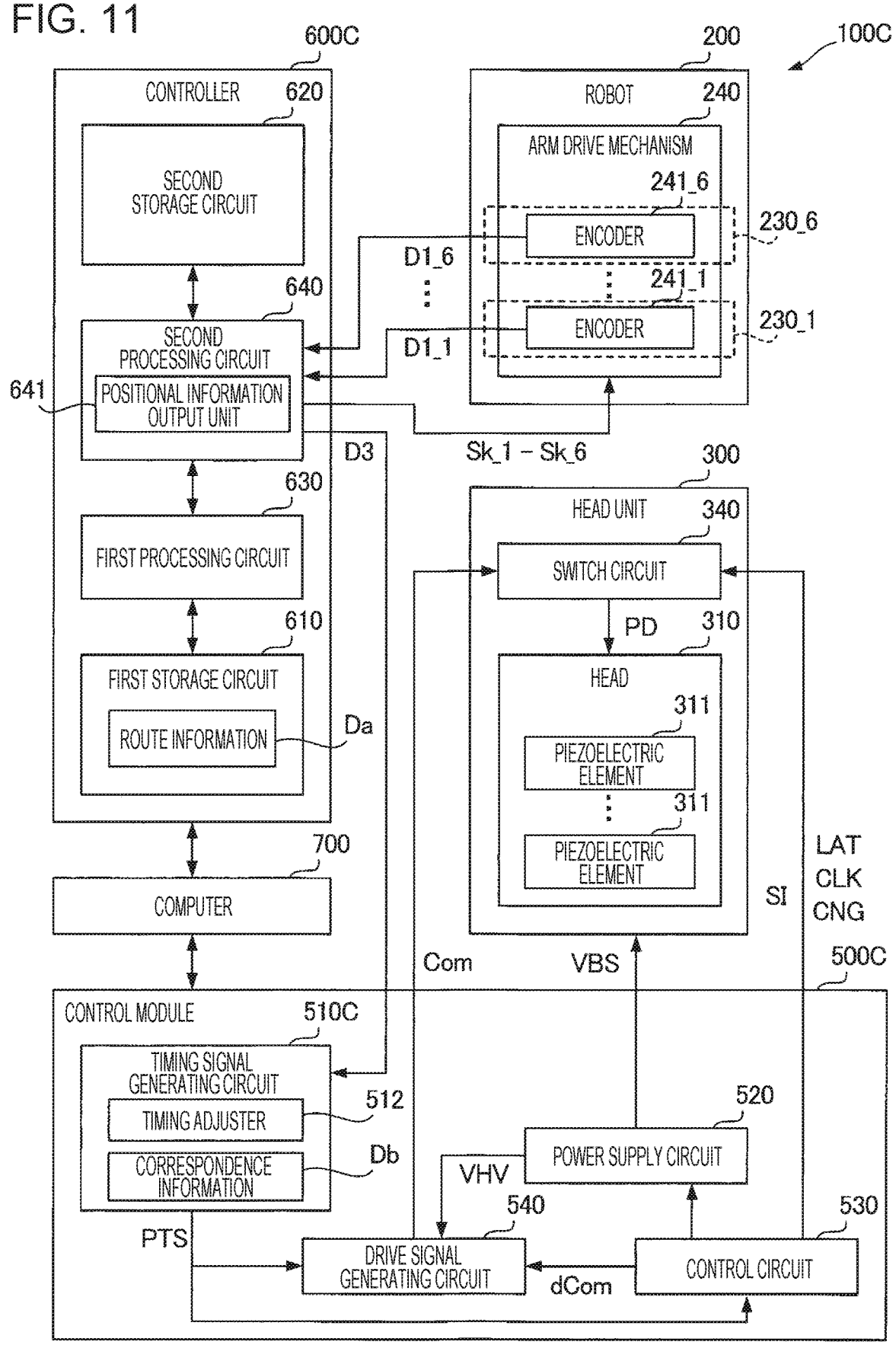
FIG. 11 is a block diagram illustrating an electrical configuration of a printing device according to a fifth embodiment.

FIG. 11 is a block diagram illustrating an electrical configuration of a printing device 100C according to the fifth embodiment. The printing device 100C has the same configuration as that of the printing device 100 according to the first embodiment except that the printing device 100C includes a control module 500C and a controller 600C instead of the control module 500 and the controller 600. The control module 500C is an example of the "head driving unit". The control module 500C has the same configuration as that of the control module 500 except that the control module 500C includes a timing signal generating circuit 510C instead of the timing signal generating circuit 510. The controller 600C is an example of the "robot controller". The controller 600C has the same configuration as that of the controller 600 except that the controller 600C includes a second processing circuit 640 that functions as a positional information output unit 641.

The second processing circuit 640 generates positional information D3 based on a signal D1 from one of encoders 241_1 to 241_6. In addition, the second processing circuit 640 functions as the positional information output unit 641 that outputs the positional information D3. In the present embodiment, the positional information D3 output from the positional information output unit 641 is input to the control module 500C.

Figure 12:
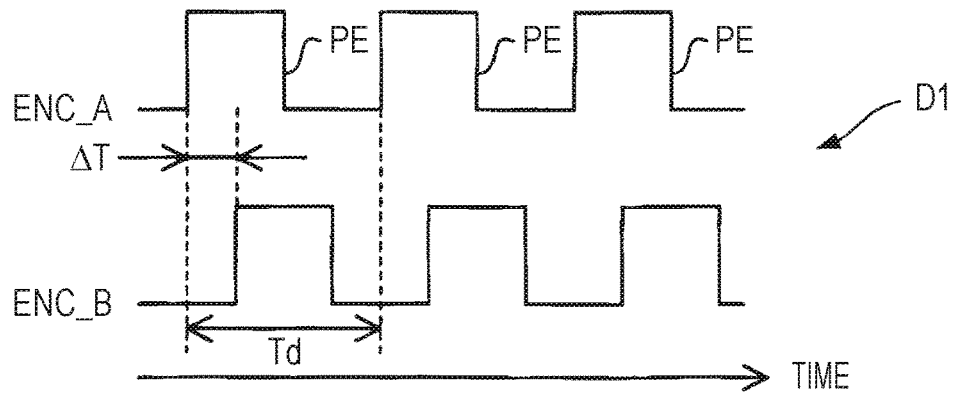
FIG. 12 is a diagram illustrating an example of signals output from encoders.

FIG. 12 is a diagram illustrating an example of signals output from each of the encoders 241. Although not illustrated, each of the encoders 241 includes, for example, a scale, a light emitting element, and a light receiving element. The light emitting element emits light toward the scale. The light receiving element receives light included in the light emitted by the light emitting element and reflected on or transmitted through the scale, and outputs signals ENC_A and ENC_B as signals output from the encoder 241, as illustrated in FIG. 12. Each of the encoders 241 may be an absolute encoder or an incremental encoder. The waveforms of the signals are not limited to the example illustrated in FIG. 12.

Each of the signals ENC_A and ENC_B output from each of the encoders 241 includes a pulse PE that appears as a joint corresponding to the encoder 241 among the joints rotates. A time interval Td between the time when the pulse PE appears and the time when the next pulse PE appears becomes shorter as the rotation speed of the joint increases. Therefore, the rotation speed of the joint can be measured based on the time interval Td. The time interval Td of the signal ENC_A is equal to the time interval Td of the signal ENC_B. However, the phase of the signal ENC_A is shifted from the phase of the signal ENC_B by 90 degrees as a shift amount ΔT. Directions in which the phases of the signals ENC_A and ENC_B are shifted are different depending on the rotational direction of the joint. Therefore, the rotational direction of the joint can be identified based on the directions.

The second processing circuit 640 includes a function of cumulatively counting pulses PE. The positional information output unit 641 outputs the cumulatively counted value as the positional information D3 that is information regarding the position of a head 310 in each control cycle C2. The cumulatively counted value varies according to the rotation angle of the joint corresponding to the signal D1 from the encoder 241.

Normally, in a printing operation, the position indicated by the positional information D3 does not have a linear relationship with the position of the head 310 in the scan direction. Therefore, a timing adjuster 512 performs the same process as that of the timing adjuster 511 according to the first embodiment after using correspondence information Db to convert the positional information D3 into the positional information D2 described in the first embodiment.

In this case, the correspondence information Db is stored in the timing signal generating circuit 510C. The correspondence information Db is information regarding a correspondence relationship between a rotation angle indicated by the positional information D3 and time or the position. The correspondence information Db is input to the timing signal generating circuit 510C from the computer 700. The timing signal generating circuit 510C according to the present embodiment is provided as one constituent component of the control module 500C, but may be provided as one constituent component of the controller 600C. The timing signal generating circuit 510C may be provided independently of the control module 500C and the controller 600C. The correspondence information Db is described below.

Figure 13:
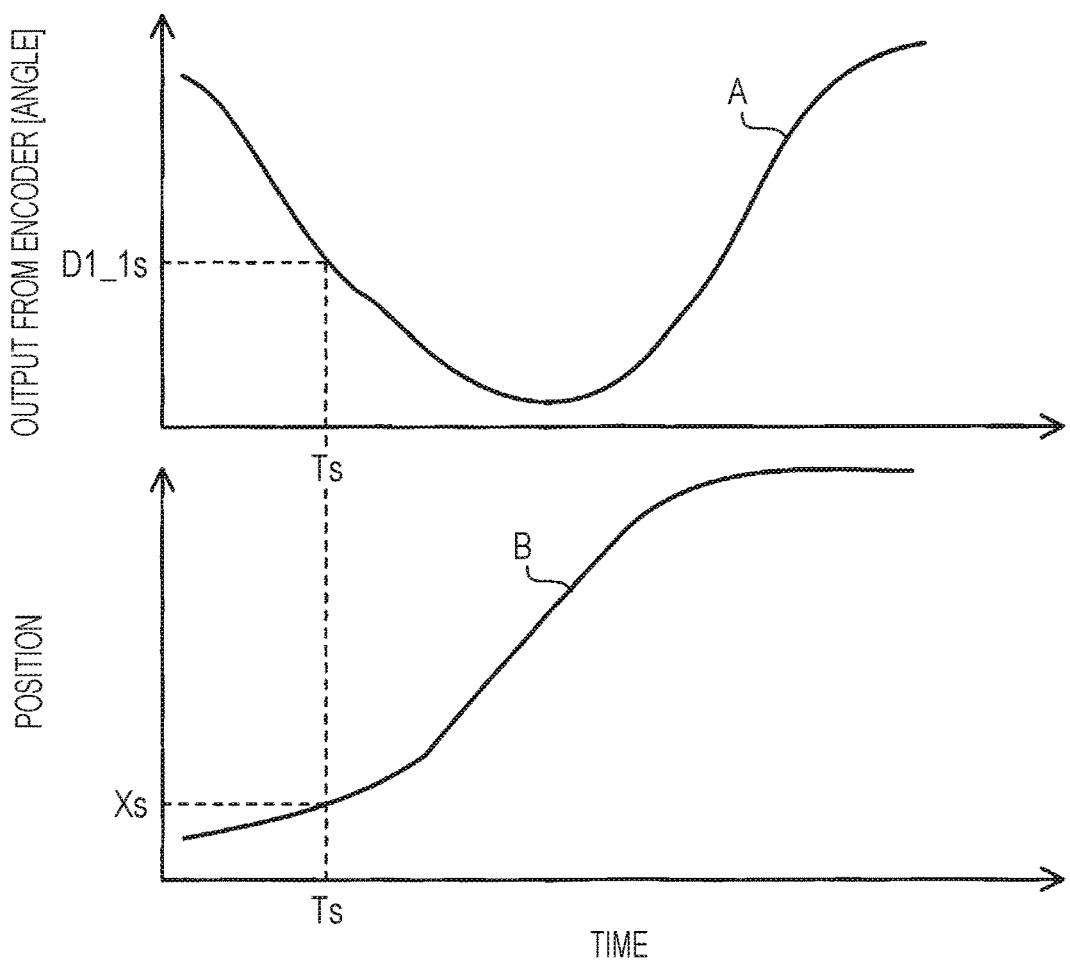
FIG. 13 is a diagram illustrating an example of correspondence information to be used to convert a signal from an encoder into positional information.

FIG. 13 is a diagram illustrating an example of the correspondence information Db to be used to convert the signal from the encoder 241 into the positional information D3. An upper part of FIG. 13 illustrates transition A of the rotation angle indicated by the positional information D3 when a robot 200 moves the head 310 along a route indicated by route information Da during the printing operation. A lower part of FIG. 13 illustrates transition B of a position where the head 310 can perform printing in the X axis direction on the surface WF of the work W. The printing operation is the printing operation illustrated in FIG. 4.

The position of a head unit 300 where the first printing is to be performed during the time when the head unit 300 passes above the surface WF of the work W along a scan direction DS is a printing start position Xs. The time when the head 310 reaches an appropriate position where the head unit 300 starts ejecting ink in order to perform printing at the printing start position Xs after the robot 200 starts driving is an ejection start time Ts. That is, in order to appropriately perform printing at the printing start position Xs above the surface WF of the work W, it is necessary to start ejecting the ink from the head unit 300 at the ejection start time Ts.

In the present embodiment, a preliminary operation is performed before the printing operation. In the preliminary operation, while the robot 200 moves the head 310 along the route indicated by the route information Da, the computer 700 acquires output information regarding output from the encoder 241_1 and positional information regarding a relative position of the head 310 with respect to the work W. Then, the computer 700 generates the correspondence information Db based on the acquired output information and the acquired positional information.

The positional information may be acquired using a result of measurement by a distance meter not illustrated in the preliminary operation or may be acquired by calculation by the first processing circuit 630 using output from the encoders 241_1 to 241_6 in the preliminary operation. The positional information may be acquired by printing a test pattern on the work W in the preliminary operation and capturing an image of the test pattern by a camera not illustrated. In this case, for example, the camera is fixed to the arm 226 such that relationships between the positions and orientations of the head unit 300 and the camera are fixed, and the positional information is acquired based on information of the image captured by the camera. The test pattern may be printed without using the work W, and an object on which a print region for the test pattern has the same shape as that of the work W can be used.

Even in the fifth embodiment, the head 310 can be operated at a desired timing. In the present embodiment, as described above, the positional information output unit 641 outputs, as the positional information D3, information regarding a rotation angle indicated by a signal D1 from at least one of the number N of encoders 241. The control cycle of each of the joints 230 based on signals D1 from the encoders 241 is shorter than a control cycle for calculating coordinates of the distal end of the robot 200 by forward kinematics calculation based on the signals D1 from the number N of encoders 241 in general. That is, the control cycle of the second processing circuit 640 is shorter than the control cycle of the first processing circuit 630 in general. Therefore, the positional information output unit 641 included in the second processing circuit 640 can output information regarding a cumulatively counted value of the number of pulses PE included in each of the signals D1 from the encoders 241, the output information can be used as the positional information D3 to adjust the ejection timing with high accuracy.

6. Modifications

The embodiments exemplified above may be variously modified. Specific aspects of modifications that may be applied to each of the embodiments are exemplified below. Two or more aspects arbitrarily selected from the following exemplifications may be combined as appropriate as long as the aspects are not mutually exclusive.

6-1. First Modification

Although the configuration in which the 6-axis vertical articulated robot is used as the moving mechanism is exemplified in each of the embodiments, each of the embodiments is not limited to the configuration. The moving mechanism may three-dimensionally change the relative position and orientation of the head with respect to the work. Therefore, the moving mechanism may be a vertical articulated robot other than the 6-axis vertical articulated robot and may be a horizontal articulated robot, for example. In addition, each of the movable portions included in the robot arm is not limited a rotating mechanism and may have an extendable mechanism or the like, for example.

6-2. Second Modification

Although the configuration in which the screw or the like is used to fix the head to the distal end of the robot arm is exemplified in each of the embodiments, each of the embodiments is not limited to the configuration. For example, a gripping mechanism such as a hand attached to the distal end of the robot arm may grip the head to fix the head to the distal end of the robot arm.

6-3. Third Modification

Although the configuration in which the moving mechanism moves the head is exemplified in each of the embodiments, each of the embodiments is not limited to the configuration. For example, the position of the head may be fixed, the moving mechanism may move the work to three-dimensionally change the relative position and orientation of the work with respect to the head. In this case, for example, the work is gripped by a gripping mechanism such as a hand attached to the distal end of the robot arm.

6-4. Fourth Modification

Although the configuration in which the printing is performed using one type of ink is exemplified in each of the embodiments, each of the embodiments is not limited to the configuration. A configuration in which printing is performed using two or more types of ink is applicable to the present disclosure.

6-5. Fifth Modification

The printing devices described in the present disclosure may be used for purposes other than printing. For example, each of the printing devices may eject a solution containing a coloring material and may be used as a manufacturing device that forms a color filter for a liquid crystal display device. In addition, each of the printing devices may eject a solution containing a conductive material and may be used as a manufacturing device that forms a wiring and an electrode on a wiring substrate. In addition, each of the printing devices can be used as a jet dispenser that applies liquid such as an adhesive to the work.

What is claimed is:

1. A printing device comprising:
   a head that ejects liquid to a work;
   a robot that changes relative positions of the work and the head;
   a positional information output unit that outputs positional information regarding a position of the robot; and
   a timing adjuster that adjusts, based on the positional information, an ejection timing of ejecting the liquid from the head, wherein
   when a timing of acquiring first positional information as the positional information by the timing adjuster is a first acquisition timing,
   a timing of acquiring second positional information as the positional information by the timing adjuster after the first acquisition timing is a second acquisition timing, and
   the ejection timing after the second acquisition timing is a first ejection timing,
   the timing adjuster adjusts the first ejection timing based on the first positional information and the second positional information, and
   wherein a time interval between the first acquisition timing and the second acquisition timing is equal to a control cycle of the positional information output unit.

2. The printing device according to claim 1, further comprising a robot controller that includes the positional information output unit and controls an operation of the robot.

3. The printing device according to claim 1, further comprising a head driving unit that drives the head, wherein
   the timing adjuster outputs a timing signal defining the ejection timing, and
   the head driving unit drives the head at a timing based on the timing signal.

4. The printing device according to claim 1, wherein a time interval between the second acquisition timing and the first ejection timing is shorter than the control cycle.

5. The printing device according to claim 4, wherein when the ejection timing subsequent to the first ejection timing is a second ejection timing, the timing adjuster adjusts the second ejection timing based on the first positional information and the second positional information.

6. The printing device according to claim 5, wherein a time interval between the second acquisition timing and the second ejection timing is shorter than the control cycle.

7. The printing device according to claim 5, wherein when a timing of acquiring third positional information as the positional information by the timing adjuster after the second acquisition timing is a third acquisition timing, the first ejection timing and the second ejection timing are between the second acquisition timing and the third acquisition timing.

8. The printing device according to claim 7, wherein a time interval between the second acquisition timing and the third acquisition timing is equal to the control cycle of the positional information output unit.

9. The printing device according to claim 4, wherein
   when a timing of acquiring third positional information as the positional information by the timing adjuster after the second acquisition timing is a third acquisition timing, and
   the ejection timing subsequent to the first ejection timing is a second ejection timing,
   the third acquisition timing is after the first ejection timing and before the second ejection timing, and
   the timing adjuster adjusts the second ejection timing based on the second positional information and the third positional information.

10. The printing device according to claim 9, wherein a time interval between the second acquisition timing and the third acquisition timing is equal to the control cycle of the positional information output unit.

11. The printing device according to claim 10, wherein a time interval between the first ejection timing and the second ejection timing is equal to or longer than the control cycle of the positional information output unit.

12. The printing device according to claim 1, further comprising a robot controller that controls an operation of the robot, wherein the robot includes
   a number N of movable portions, N being a natural number of 2 or greater, and
   a number N of encoders that are provided corresponding to the number N of movable portions and measure operational amounts of the movable portions,
   the robot controller calculates coordinates indicating a position of the head based on signals from the number N of encoders, and
   the positional information output unit outputs, as the positional information, information regarding the coordinates.

13. The printing device according to claim 1, wherein the robot includes
   a number N of movable portions, N being a natural number of 2 or greater, and
   a number N of encoders that are provided corresponding to the number N of movable portions and measure operational amounts of the movable portions, and
   the positional information output unit outputs, as the positional information, information regarding a rotation angle indicated by a signal from at least one of the number N of encoders.

14. A method of a printing device which includes a head that ejects liquid to a work and a robot that changes relative positions of the work and the head, comprising:
- an outputting step of outputting positional information regarding a position of the robot by a positional information output unit,
- a first timing acquiring step of acquiring a first positional information regarding a first position of the robot at a first acquisition timing, the first positional information being output by a positional information output unit,
- a second timing acquiring step of acquiring a second positional information regarding a second position of the robot at a second acquisition timing, the second positional information being output by the positional information output unit, and
- a timing adjusting step of adjusting a first ejection timing of ejecting the liquid from the head based on the first positional information and the second positional information, the first ejection timing being after the second acquisition timing,
- wherein a time interval between the first acquisition timing and the second acquisition timing is equal to a control cycle of the positional information output unit.

* * * * *